United States Patent [19]

McRae

[11] Patent Number: 6,104,813

[45] Date of Patent: *Aug. 15, 2000

[54] INTERACTIVE COMPACT DISC SYSTEM

[75] Inventor: Finlay McRae, Falkirk, United Kingdom

[73] Assignee: U.S. Philisp Corporation, New York, N.Y.

[*] Notice: This patent is subject to a terminal disclaimer.

[21] Appl. No.: 09/271,747

[22] Filed: Mar. 18, 1999

Related U.S. Application Data

[62] Division of application No. 08/716,178, Sep. 23, 1996, Pat. No. 5,905,797, which is a division of application No. PCT/GB95/00646, Mar. 23, 1995.

[30] Foreign Application Priority Data

Mar. 23, 1994 [GB] United Kingdom ................... 9405753

[51] Int. Cl.[7] ..................................................... H04N 7/167
[52] U.S. Cl. ............................................ 380/201; 380/203
[58] Field of Search ...................................... 380/201, 203

[56] References Cited

U.S. PATENT DOCUMENTS

| 5,371,792 | 12/1994 | Asai et al. | 380/201 |
| 5,754,649 | 5/1998 | Ryan et al. | 380/203 |
| 5,883,958 | 3/1999 | Ishiguro et al. | 380/201 |
| 5,896,454 | 8/1999 | Cookson et al. | 380/203 |
| 5,905,797 | 5/1999 | McRae | 380/203 |

*Primary Examiner*—Salvatore Cangialosi
*Attorney, Agent, or Firm*—Leroy Eason

[57] ABSTRACT

A system for controlling the playing of rented compact discs on an end-user's compact disc player. The end-user obtains a validation disc on which is stored a control program and an expiry date. When the validation disc is inserted into the user's player, the player downloads the control program into its memory and runs the program. This causes the expiry date to be read from the disc and stored in the player's memory. Discs to be played on the player have stored thereon a second control program which is downloaded into the player's memory when they are inserted into the player. This second control program causes the player to check whether or not the current date, as maintained by the player, is later than the stored expiry date. If the current date is later, playing of the disc is prevented, whilst if it is earlier, playing of the disc is allowed.

11 Claims, 5 Drawing Sheets

INTERACTIVE COMPACT DISC SYSTEM

CROSS-REFERENCE TO RELATED APPLICATIONS

This is a divisional of application Ser. No. 08/716,178, filed Sep. 23, 1996 U.S. Pat. No. 5,905,797 which is a 371 of PCT/GB95/00646 filed Mar. 23, 1995.

BACKGROUND OF THE INVENTION

The present invention relates to interactive compact disc systems and in particular to systems for controlling the use of compact discs in an interactive compact disc player.

In many areas, it is important to be able to precisely control the playing time of compact discs in compact disc players. For example, in locations where compact discs are used to provide background music, for example pubs and supermarkets, it is customary for the Background Music (BGM) supplier to supply the music subject to a rental contract which stipulates payment in advance and the return of all tapes or discs at the end of the contract period. It sometimes happens that customers default in their payment, but having possession of (though not title to) the tapes or discs continue to play them. It is a comparatively lengthy and expensive process for the BGM supplier to exercise his legal rights for payment or repossession—while the customer is still enjoying the benefits of the music service. In addition, the rentor is legally liable to the copyright authorities (in this country the PPL) for the payment of copyright fees while the music is being played. There is presently no available system which automatically controls CD playing to facilitate collection of licence payments.

SUMMARY OF THE INVENTION

An object of the present invention is to obviate or mitigate this disadvantage.

According to a fist aspect of the present invention there is provided a method of controlling the playing of a compact disc on a compact disc player and comprising storing at least one control date in a memory of the player and storing a control program on the compact disc to be played, updating said at least one control date stored in the player memory, by reading information from a validation disc and, in response to a request that said compact disc be played, loading said control program from the compact disc to be played into a memory of the player and operating the player in accordance with the control program to read said at least one control date currently stored in the player memory to determine whether or not the control date is later than the current date held by the compact disc player and to correspondingly enable or disable the playing of the compact disc.

The invention is applicable in particular to interactive compact disc systems which are capable of operating in accordance with software stored on the compact disc. One such system is the Philips "CD-i" system.

It will be apparent that embodiments of the present invention may provide a system for accurately controlling the times at which, and for which, compact discs may be played allowing royalties and licences to be determined on a "pay by use" basis.

According to a second aspect of the present invention there is provided a method of operating an interactive compact disc player and comprising the steps of:

a) inserting a validation disc into the player and reading a first control program stored on the disc into a memory of the player;

b) operating the player in accordance with the first control program to read a control date stored on the validation disc into the player's memory;

c) removing the validation disc from the player and inserting thereinto a compact disc to be played;

d) reading a second control program stored on the disc to be played into the player's memory; and e) operating the player in accordance with the second control program to compare a current date provided by a system clock with the stored control date and to enable the playing of the compact disc if the control date is later than the current date and to disable the playing of the disc if the contrary is true.

According to a third aspect of the present invention there is provided in combination a validation compact disc and a compact disc to be played, the validation disc having digitally encoded thereon a first control program for causing an interactive compact disc player to read from the validation disc a control date and to store the control date in the memory of the player, and said compact disc to be played having stored thereon a second control program for causing an interactive compact disc player to search the player's memory for a control date read from said validation disc and, if found, to compare the control date with a date provided by a system clock to determine whether or not the compact disc can be played.

According to a fourth aspect of the present invention there is provided a method of controlling the playing of a compact disc on an end-user's compact disc player and comprising storing a control program on the compact disc to be played, loading the control program from the disc to be played into a memory of the player, and operating the player according to the control program to:

generate a request-code using the current player time and/or date;

display the request-code so that it can be read by the end-user; and respond only to the input of an authorised key-number by the end-user, generated remotely from the player but in dependence upon said request-code, to allow the disc to be played.

BRIEF DESCRIPTION OF THE DRAWINGS

These and other aspects of the present invention will become apparent from the following description and accompanying drawings, in which.

DESCRIPTION OF THE PREFERRED EMBODIMENTS

It will be understood that the present invention is applicable to any system in which it is required to control accurately the play time of compact discs on an interactive compact disc player. For the purpose of example, however, the following description is of a system for controlling the playing of background music and video images in order to allow the licence fees paid by the user to be commensurate with the actual music and video images played.

Conventional background music playing systems are often of the cassette tape playing type or, more recently, of the compact disc playing type. With such systems it is difficult to determine the extent to which discs are played: it is generally necessary to charge a block licence fee which allows the user unlimited use of the discs for a specified term. An alternative method of licence fee collection is for the user to keep an accurate record of the discs played. However, this later method of collection is difficult to enforce both because it is time consuming for the user to record playing times and also because it is open to abuse. More recently there has become available a modified type of compact disc player known as an interactive compact disc ("CD-i") player. "CD-i" systems are generally similar to conventional compact discs except that they have been modified to include computer means arranged to operate the "CD-i" player in accordance with software contained on a disc to be played. At present, the main applications of interactive compact disc systems are in the field of games and education.

Figure 1:
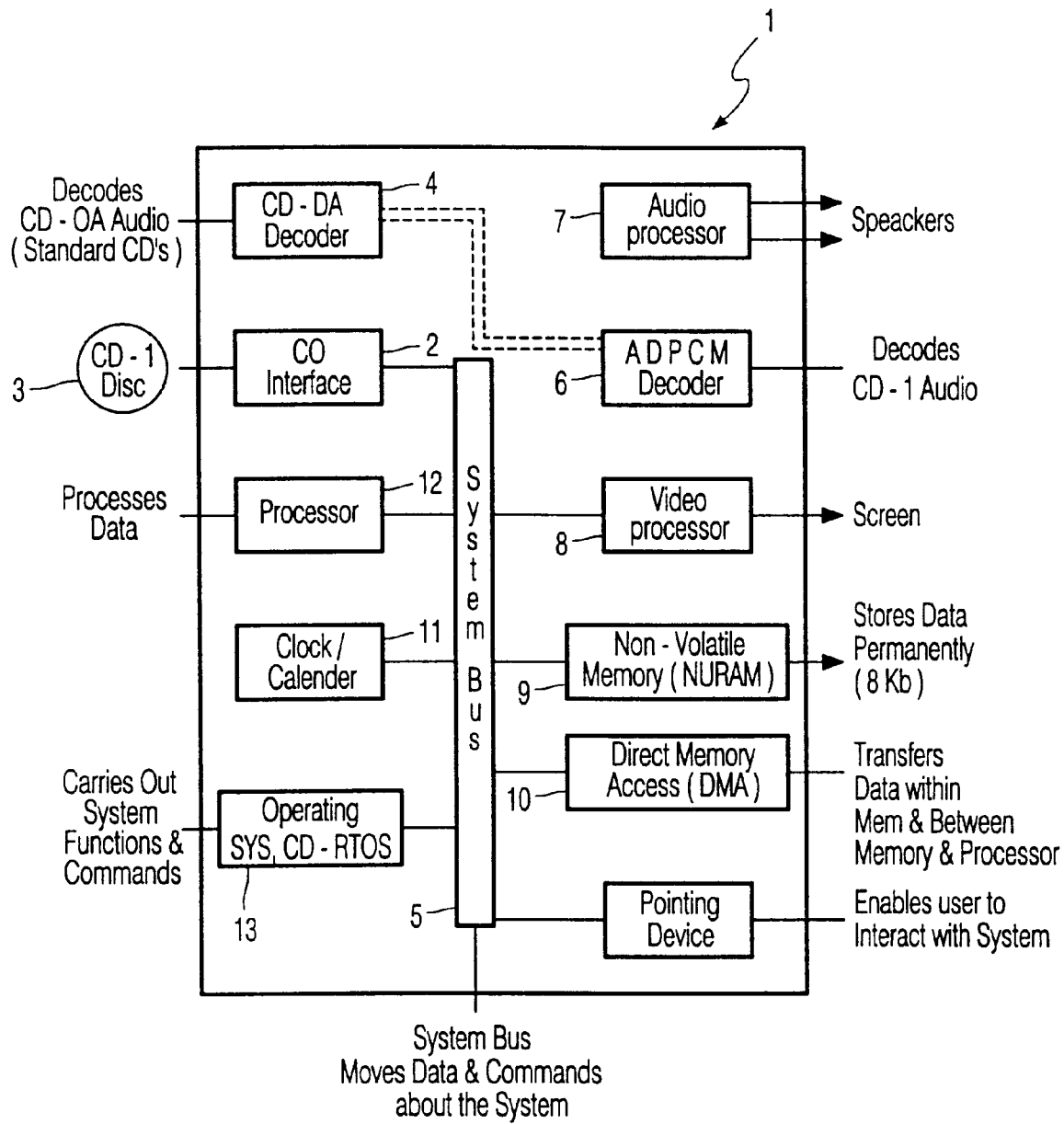
FIG. 1 shows a block diagram of a typical "CD-i" player for use with an embodiment of the present invention.

FIG. 1 shows a block diagram of a typical interactive compact disc player 1 which comprises an optical disc reading system (not shown) coupled to a CD interface 2 arranged to receive digital data read from a disc 3. The digital data is transferred from the compact disc to the player through the CD interface. The audio component of the data passes through one of the two decoders. If the data is from an ordinary CD (i.e. CD-DA or Compact Disc Digital Audio) the data is decoded by the CD-DA decoder. If the data is from a "CD-i" disc the Adaptive Delta Pulse Code Modulator (ADPCM) decodes the audio signal as it comes off the disc. The audio digital data is in turn transmitted to an audio processor 7 for conversion into analogue form and for transmission to the system speakers (not shown). The system also contains a video processor 8 which receives video signals from the CD Interface 2 via the system bus and converts them into a form for display on a video-screen (not shown). Also coupled to the system bus are a non-volatile memory NVRAM chip 9 which can store up to 8 kb of data for up to one year without external power and a direct memory access (DMA) chip 10 which can hold up to 1 Mb of data during operation of the processor 12. A clock/calendar 11 is provided for the purpose of providing general date information to the system. The system may also be provided with some data inputting means such as a barcode reader or a joystick. Such systems are standard.

A microprocessor 12 controls the overall operation of the system with a further area of non-volatile memory 13 storing the operating system (conventionally known as CD-RTOS) which on power-up is used by the microprocessor to initialise the system and to enable it to perform routine tasks.

The compact disc 3 to be played is provided, in addition to audio and video information, with control system software which is read into the DMA 10 of the system after insertion of the disc. Playing of the disc is controlled in accordance with this software. In conventional systems, the software is used to control the playing of the discs in accordance with instructions input by a user, for example to play a game.

In the preferred embodiment of the present invention the non-volatile memory 9 of the interactive compact disc player is used to store an "expiry" date which can be updated depending upon whether the licence fee has been paid by the user. In particular the disc licensee is provide with a special "validation" disc upon payment of an appropriate licence fee and on which is encoded a new expiry date which is the date until which the disc can be played. The validation disc also has stored on it a first control program which, when read by the interactive compact disc player, allows the system processor 12 to read the expiry date from the disc and to store it in the non-volatile memory 9.

Once a "CD-i" player is validated as described above, the user is supplied with customised compact discs for playing on the player 1 and which allows the player to provide music, video images etc. The compact disc to be played also has stored on it a second control program which is read from the disc by the player upon insertion therein. The player then operates in accordance with the second control program to assess whether or not the current date, obtained from the clock/calendar, is earlier or later than the expiry date previously loaded into the non-volatile memory using the validation disc. If the current date is earlier than the expiry date the player allows the disc to be played. However, if the current date is later than the expiry date the player does not allow the disc to be played.

Figure 2:
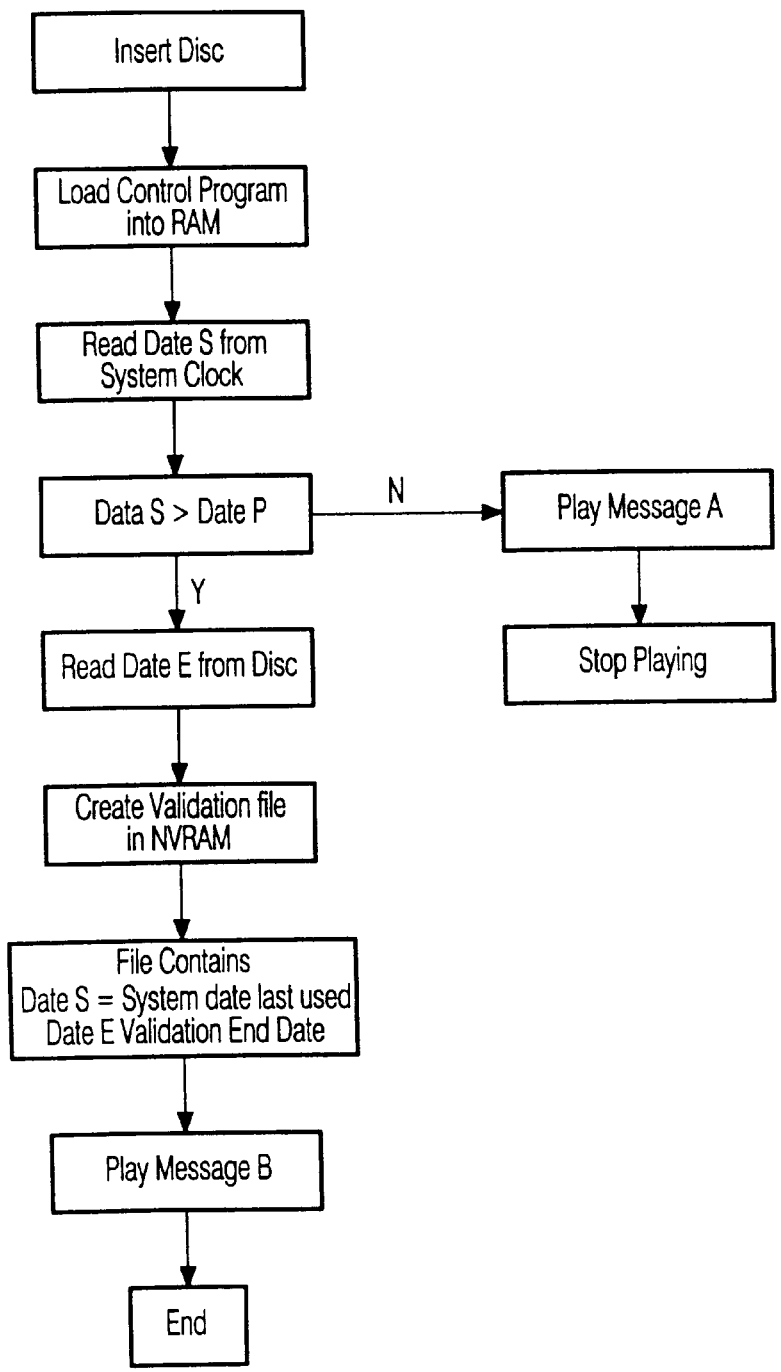
FIG. 2 is a flow diagram setting out a procedure embodying an algorithm for validating the "CD-i" player of FIG. 1.

FIG. 2 shows a flow diagram of a method for carrying out the preferred embodiment of the invention. Upon insertion of a validation disc into the interactive compact disc player, the operating system of the player causes the first control program to be read from the validation disc into a date file in the player's NVRAM (Non-Volatile RAM). The player then operates in accordance with the control program and causes a production date ("DATE P") stored on the disc to be read into the RAM. The production date is compared with the current system date ("DATE S"), generated internally by the player, as a check that the system date of the player has not been put back in an attempt of obtain unauthorised extended play. If the current system date is earlier than the production date, indicating that the system clock has been put back, the player is arranged to output a visual display and/or audio message "A", "player has wrong system date—validation process has failed". However, providing that the current system date is later than the production date, the player proceeds to read the expiry date ("DATE E") from the compact disc. The expiry date and the current system date are stored in the player's NVRAM as ("DATE E") and ("DATE S") respectively.

The player calculates from the expiry date a warning date, for example two weeks in advance of the expiry date, which is used to provide an early indication to the user that the expiry date is imminent (alternately the warning date may be stored on the disc).

Once the expiry date and the system date have been written into the NVRAM, the player displays/plays a message "B", "player has been validated until "date . . . (E)". Following display/play of this message the validation process terminates. Once the validation process is complete the validation disc would normally be returned to the licensor. It is not anticipated that the licensee would keep the validation disc.

Figure 3:
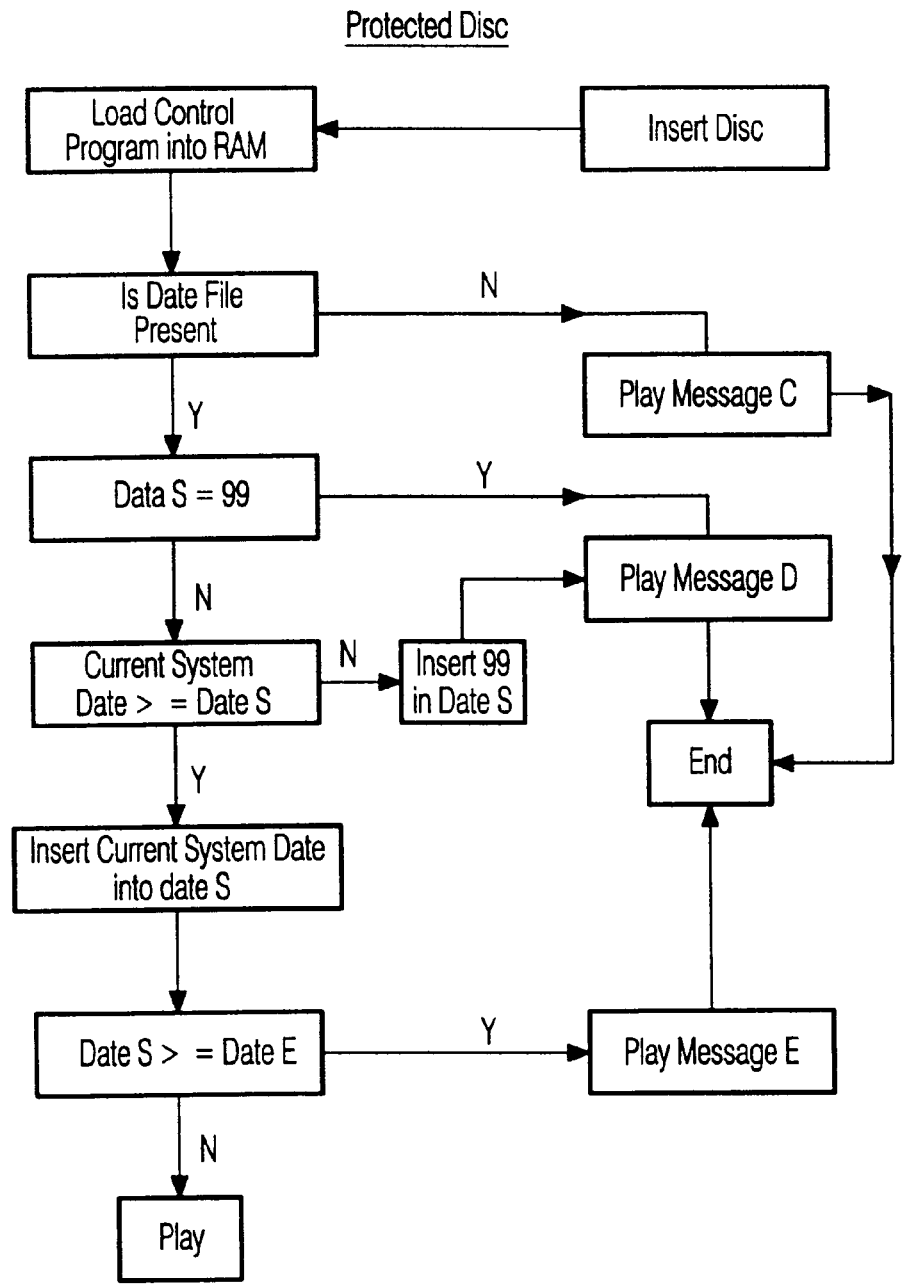
FIG. 3 is a flow diagram setting out the procedure for determining whether or not a compact disc can be played on the player of FIG. 1.

FIG. 3 shows a diagram of a method suitable for assessing whether or not the player is able to play a disc which has been inserted into a player. A control program is read from the disc to be played and is stored in the player's RAM. The player then operates in accordance with the control program to locate the date file in the NVRAM. If no date file is present the player displays/plays messages "C", "System has not been validated" and will not allow the disc to be played. If a date file is located, then the player checks ("Date S"). If ("Date S")=99 then the player will display/ play message "D", "player date has been altered" and will not allow the disc to be played. If ("Date S") is a valid date the player compares it with the current system date. If the current system date is earlier than ("Date S") (i.e. the system clock has been put back since the disc was last played) then the player will insert 99 into ("Date S") and message "D" will be played/displayed, "player date has been altered" and the player will not allow the disc to be played. This will prevent any further access to the disc as any further plays of the disc will always encounter the "99" check. Access could only be obtained at this stage with a new validation disc which would overwrite the Date file with a new valid ("Date S"). If ("Date S") is a valid date and is later than the current system date, the player will update ("Date S") with the current system date and compare ("Date S") with the expiry date ("Date E") both of which dates are stored in the date file. If the current system date exceeds the expiry date of the player displays/plays message "E", "system validation has expired", and will not allow the disc to be played. If on the other hand, the expiry date is later than the current system date, the player will proceed to play the disc.

In certain circumstances it may not always be convenient to provide an end-user with a validation disc in addition to a disc to be played for reasons of economy and/or convenience. One such circumstance is where the end-user wishes to rent a disc for playing at home from a CD rental shop, and the disc is only intended to be played once. It is therefore desirable to provide a validation system which could enable the end-user to validate his player using only the disc to be played and a unique validation code.

Figure 4:
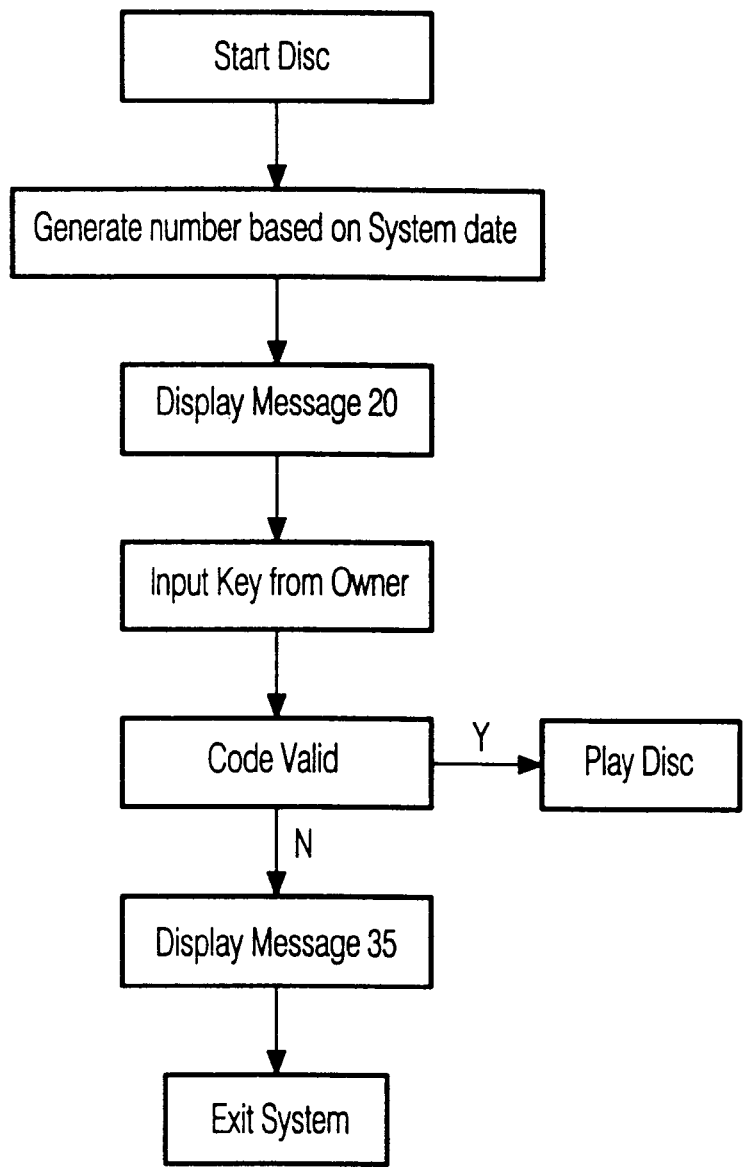
FIG. 4 is a flow diagram setting out an alternative procedure for validating the player of FIG. 1 on a one-play basis.

A second embodiment of the present invention (a flow chart for which is shown in FIG. 4) therefore envisages that the hirer (e.g. a rental shop owner) is provided with a "CD-i" system as described above and which can be validated for a fixed period using a validation disc provided by the copyright owner.

The end-user is provided with an interactive CD player which allows him to play discs hired from the hirer. However, on inserting any such disc into his player, the software on the disc when loaded into the player will cause a "request-code" to be displayed which is calculated by the player using both the current date and time (as held by the player) and a unique player serial number. The player will then display a request for the user to enter a "key-number". The disc cannot be played until this key-number is entered.

The end-user obtains the key-number by telephoning the hirer and providing the request code to him. The hirer then inputs the request code into his player which is arranged to generate (providing that it has been correctly validated with an authorised validation disc) the required key-number using a program loaded from a "key-disc". The generated key-number is passed by the hirer to the end-user who can then enter the key-number into this player to allow the hired disc to be played. Payment for this service can be made either when the disc is collected from the shop or over the telephone when the key-number is requested.

Thus, the end-user cannot use a proprietary disc unless he first obtains a key-number to release his player. This number cannot be guessed as a secret algorithm would be used to generate it from the player's clock and calendar.

Further protection against fraud is provided in the event that a key-disc and player is stolen from an authorised hirer as the player cannot be used without a validation disc. Even if the player stolen is currently validated the length of time for which that player will remain validated will be limited by the impending expiry of the validation period.

Figure 5:
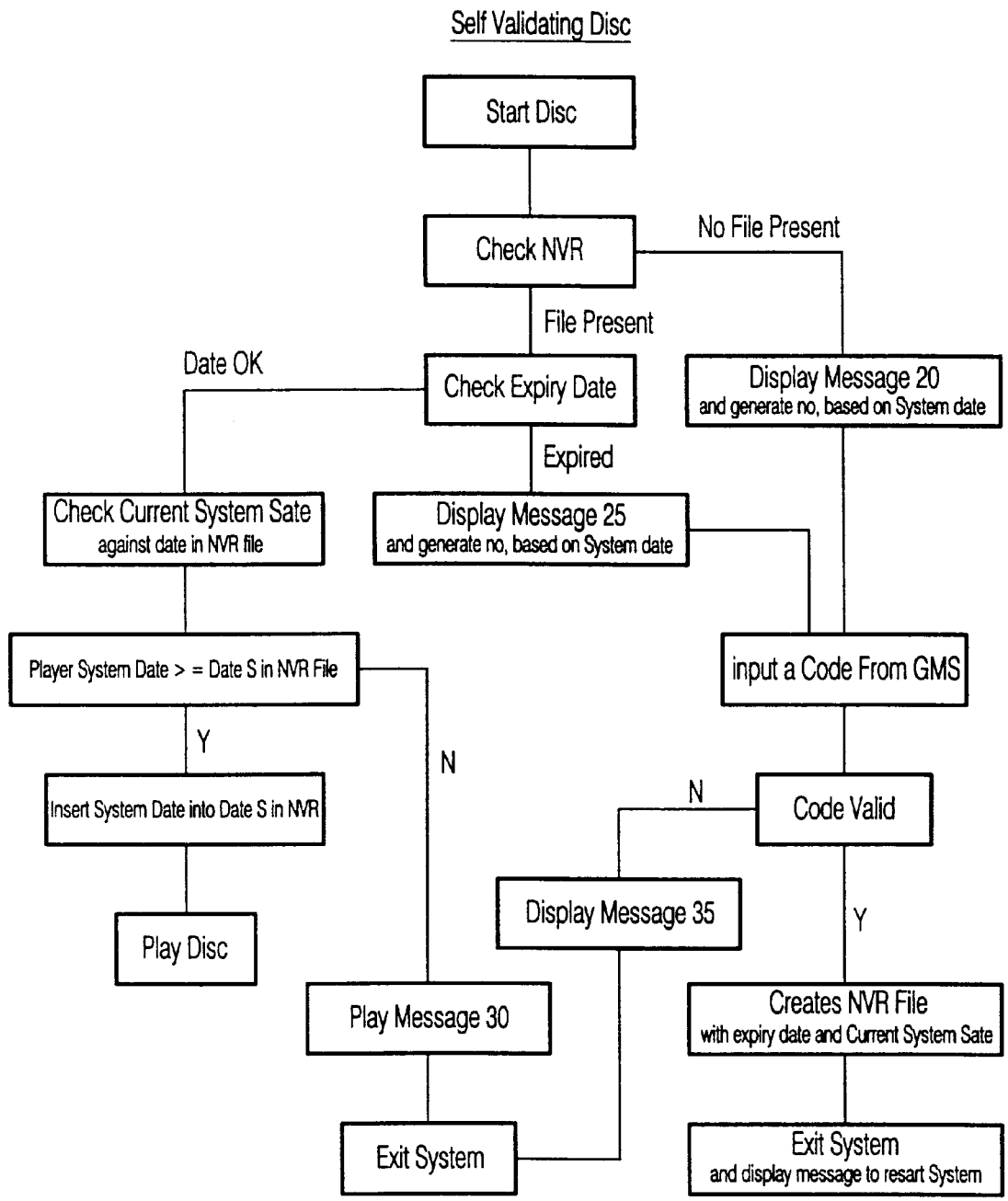
FIG. 5 is a flow diagram setting out yet another alternative procedure for validating the player of FIG. 1.

In a modification of the above embodiment, for which a flow chart is shown in FIG. 5, the end-user advises the hirer over the telephone of the period for which he requires to use the disc. This information, together with the release-code, is entered into the hirer's validated player which generates a key-number in dependence upon the rental expiry date, i.e. the current date of the end-user's player incremented by the rental period. When the end-user enters the key-number into his player, the player is released and the expiry date, decoded from the key-number, is stored in its memory. The system then functions in much the same ways as the first embodiment described above with reference to FIGS. 1 to 3.

Where the copyright owner wishes to retain control over the payment system, the rental shop is not provided with a player which generates the key-number and the end-user is required to telephone the copyright owner to obtain the key-number. The copyright owner would generally use a computer to generate the key-number from the request code.

It will be appreciated that modifications may be made to the above described embodiment within the scope of the invention. For example, the disc may be played in accordance with further software instructions contained in the disc, e.g. track order, exclude tracks, warning date etc. In particular, the software on a disc which is available to the end-user may be made dependent upon the payments made by him and/or the location where the disc is to be played. For example, a particular disc to be played may be provided with advertisement tracks (audio and/or video) interspersed with music tracks. Whilst it may be appropriate to play the advertisements in certain retail premises it may not be appropriate to play them in, for example, a leisure centre. Thus, the control program stored on the disc is designed to look for a code, which may be stored in the validation file from a validation disc or which may be contained in a key-number input to the player by the user, which determines whether or not the adverts are to be played. If the adverts are not to be played the control program will cause the advert tracks to be deleted from the playing sequence. In a modification of this embodiment the disc to be played has stored thereon a list of users who require the advertisements to be played. When the disc control program is loaded into the player, the program checks the validation file to see if a user ID matching one of the IDs in the stored list is present. Only if a matching ID is found are the advertisement tracks played.

What is claimed is:

1. A method of controlling the playing of an optical disc on an optical disc player, which method comprises storing validation information and a control program in a memory of the player, and in response to a request that said optical disc be played, operating the player in accordance with the control program; said control program causing the player to read the validation information currently stored in the player memory to determine whether and to what extent the request is allowable according to the validation information, and to correspondingly control playing of said optical disc.

2. A method according to claim 1, wherein the validation information comprises a control date, and the control program causes the player to compare a current date provided by a system clock/calendar with the stored control date to determine whether and to what extent the request to play said optical disc is allowable.

3. A method according to claim 1, wherein the control program is stored on said optical disc, and, in response to a request that said optical disc be played, said control program is loaded from said optical disc into the memory of the player.

4. A method according to claim 1, further comprising the steps of:
   a) prior to inserting said optical disc into the player in order to be played, inserting a validation disc thereinto and reading a first control program stored on said validation disc into a memory of the player;
   b) operating the player in accordance with the first control program to read a control date stored on the validation disc into the player memory;
   c) removing the validation disc from the player and inserting thereinto said optical disc;
   d) reading a second control program stored on said optical disc into the player memory; and
   e) operating the player in accordance with the second control program to compare a current date provided by a system clock/calendar with the stored control date and to enable the playing of said optical disc if the control date is later than the current date and to disable the playing of said optical disc if the control date is earlier than the current date.

5. A method according to claim 4, wherein also stored on the validation disc is a disc production date, which date is read from the validation disc, prior to storing the validation information, for comparison with the current date in the player memory; and if the current date is earlier than the disc production date the validation process is terminated, whereas if the current date is later than the disc production date the validation process is continued.

6. A method according to claim 4, wherein the validation process comprises storing the current date, at the time of validation, as a check date in the player memory; and each time a request is made to play an optical disc the stored check date is compared with the current date, and:
   i) if the current date is earlier than the check date, playing of said optical disc is prevented, and
   ii) if the current date is the same as or later than the check date, playing of said optical disc is permitted and the existing check date is replaced by the current date as a new check date.

7. A method according to claim 1, wherein the control program is arranged to:
   generate a request-code in dependence on the current player time and/or date provided by a system clock/calendar;
   display the request-code so that it can be read by a user; and
   require input to the player of an authorized key-number by the user, generated remotely from the player but responsive to said request-code, for determining whether or not the request to play said optical disc is allowable.

8. A method according to claim 7, wherein the authorized key-number is generated on a remote optical disc player which has stored therein an algorithm program for converting a request-code into an authorized key-number.

9. A method according to claim 7, wherein entry of the authorized key-number into the player allows said optical disc to be played a predetermined number of times.

10. A method according to claim 7, wherein entry of the authorized key-number into the player causes a control date to be stored in the player memory, so that the player permits said optical disc to be played up to the control date but not after the control date.

11. A method according to claim 1, further comprising the step of storing in the player memory a control code which interacts with the control program which is loaded into the player memory from said optical disc, the interaction determining which tracks on said optical disc are permitted to be played and which are not permitted to be played.

* * * * *